(12) United States Patent
Uecker et al.

(10) Patent No.: US 11,014,185 B2
(45) Date of Patent: May 25, 2021

(54) SYSTEMS, METHODS, AND APPARATUS FOR CONTROL OF WIRE PREHEATING IN WELDING-TYPE SYSTEMS

(71) Applicant: ILLINOIS TOOL WORKS INC., Glenview, IL (US)

(72) Inventors: James Lee Uecker, Appleton, WI (US); Todd Earl Holverson, Appleton, WI (US); Steven Blair Massey, Jr., Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 331 days.

(21) Appl. No.: 16/143,835

(22) Filed: Sep. 27, 2018

(65) Prior Publication Data

US 2020/0101555 A1 Apr. 2, 2020

(51) Int. Cl.
*B23K 9/09* (2006.01)
*B23K 9/10* (2006.01)
*B23K 9/095* (2006.01)

(52) U.S. Cl.
CPC .......... *B23K 9/1093* (2013.01); *B23K 9/0953* (2013.01); *B23K 9/0956* (2013.01); *B23K 9/1075* (2013.01)

(58) Field of Classification Search
CPC ........ B23K 9/10; B23K 9/095; B23K 9/1093; B23K 9/32; B23K 9/0953; B23K 9/0956; B23K 9/1075; B23K 9/173; B23K 9/235
See application file for complete search history.

(56) References Cited

U.S. PATENT DOCUMENTS

| 2,365,958 A | 12/1944 | Holslag |
| 2,416,047 A | 2/1947 | Dolan |

(Continued)

FOREIGN PATENT DOCUMENTS

| AT | 413801 | 6/2006 |
| CA | 2072711 | 12/1992 |

(Continued)

OTHER PUBLICATIONS

Canadian Office Action Application No. 3,005,408 dated Mar. 19, 2019, 8 pages.

(Continued)

*Primary Examiner* — Brian W Jennison
(74) *Attorney, Agent, or Firm* — McAndrews, Held & Malloy, Ltd.

(57) ABSTRACT

Apparatus, systems, and/or methods for weld wire preheating are disclosed. Some examples of the present disclosure relate to welding-type systems that use one or more preheaters to heat welding wire prior to an arc and/or deposition on a weldment. The welding wire may have one or more characteristics. A preheating control may determine a governing characteristic of the one or more welding wire characteristics and establish a threshold temperature and/or target temperature based on the governing characteristic. The preheating control may further control the one or more preheaters based on the threshold temperature and/or target temperature, in order to avoid a deformation and/or degradation of the welding wire that would impact column strength, wire feeding, weld process stability, and/or welding consumable longevity.

17 Claims, 6 Drawing Sheets

(56) References Cited

U.S. PATENT DOCUMENTS

| | | |
|---|---|---|
| 2,976,462 A | 3/1961 | Miller |
| 3,030,495 A | 4/1962 | Anderson |
| 3,288,982 A | 11/1966 | Haruyoshi |
| 3,549,857 A | 12/1970 | Carter |
| 3,725,629 A | 4/1973 | Vickers |
| 3,809,853 A | 5/1974 | Manz |
| 3,849,871 A | 11/1974 | Kaunitz |
| 3,912,980 A | 10/1975 | Crump |
| 3,946,349 A | 3/1976 | Haldeman |
| 4,160,967 A | 7/1979 | Beech |
| 4,188,419 A | 2/1980 | Detert |
| 4,222,023 A | 9/1980 | Beech |
| 4,329,561 A | 5/1982 | Schafer |
| 4,426,565 A | 1/1984 | Rueter |
| 4,447,703 A | 5/1984 | Stol |
| 4,467,176 A | 8/1984 | Mizuno |
| 4,493,971 A | 1/1985 | Nawa |
| 4,531,040 A | 7/1985 | Nawa |
| 4,536,634 A | 8/1985 | Nawa |
| 4,546,234 A | 10/1985 | Ogasawara |
| 4,547,654 A | 10/1985 | Stol |
| 4,580,026 A | 4/1986 | Stol |
| 4,614,856 A | 9/1986 | Hori |
| 4,628,182 A | 12/1986 | Hori |
| 4,631,385 A | 12/1986 | Rothermel |
| 4,667,083 A | 5/1987 | Stol |
| 4,675,494 A | 6/1987 | Dilay |
| 4,728,761 A | 3/1988 | Mucha |
| 4,897,523 A | 1/1990 | Parks |
| 4,950,348 A | 8/1990 | Larsen |
| 4,954,691 A | 9/1990 | Parks |
| 4,973,821 A | 11/1990 | Martin |
| 5,001,326 A | 3/1991 | Stava |
| 5,043,557 A | 8/1991 | Tabata |
| 5,086,207 A | 2/1992 | Deam |
| 5,101,086 A | 3/1992 | Dion |
| 5,118,028 A | 6/1992 | Ogawa |
| 5,140,123 A | 8/1992 | Mitani |
| 5,148,001 A | 9/1992 | Stava |
| 5,208,433 A | 5/1993 | Hellegouarc |
| 5,270,516 A | 12/1993 | Hamamoto |
| 5,278,390 A | 1/1994 | Blankenship |
| 5,315,089 A | 5/1994 | Hughes |
| 5,319,179 A | 6/1994 | Joecks |
| 5,343,023 A | 8/1994 | Geissler |
| 5,349,156 A | 9/1994 | Madigan |
| 5,352,871 A | 10/1994 | Ross |
| 5,367,138 A | 11/1994 | Moss |
| 5,412,184 A | 5/1995 | McGaffigan |
| 5,461,215 A | 10/1995 | Haldeman |
| 5,466,916 A | 11/1995 | Iguchi |
| 5,504,309 A | 4/1996 | Geissler |
| 5,521,355 A | 5/1996 | Lorentzen |
| 5,526,561 A | 6/1996 | McGaffigan |
| 5,644,461 A | 7/1997 | Miller |
| 5,710,413 A | 1/1998 | King |
| 5,714,738 A | 2/1998 | Hauschulz |
| 5,739,506 A | 4/1998 | Hanton |
| 5,742,029 A | 4/1998 | Stava |
| 5,756,967 A | 5/1998 | Quinn |
| 5,760,373 A | 6/1998 | Coiling |
| 5,773,799 A | 6/1998 | Maxfield |
| 5,783,799 A | 7/1998 | Geissler |
| 5,832,765 A | 11/1998 | Ohashi |
| 5,844,193 A | 12/1998 | Nomura |
| 5,963,022 A | 10/1999 | Buda |
| 5,968,587 A | 10/1999 | Frankel |
| 5,994,659 A | 11/1999 | Offer |
| 6,002,104 A | 12/1999 | Hsu |
| 6,008,470 A | 12/1999 | Zhang |
| 6,043,471 A | 3/2000 | Wiseman |
| 6,051,810 A | 4/2000 | Stava |
| 6,077,369 A | 6/2000 | Kusano |
| 6,078,023 A | 6/2000 | Jones |
| 6,090,067 A | 7/2000 | Carter |
| 6,107,602 A | 8/2000 | Geissler |
| 6,115,273 A | 9/2000 | Geissler |
| 6,160,241 A | 12/2000 | Stava |
| 6,169,263 B1 | 1/2001 | Derby |
| 6,204,476 B1 | 3/2001 | Reynolds |
| 6,248,976 B1 | 6/2001 | Blankenship |
| 6,259,059 B1 | 7/2001 | Hsu |
| 6,265,688 B1 | 7/2001 | Lyshkow |
| 6,274,845 B1 | 8/2001 | Stave |
| 6,278,074 B1 | 8/2001 | Morlock |
| 6,292,715 B1 | 9/2001 | Rongo |
| 6,331,694 B1 | 12/2001 | Blankenship |
| 6,359,258 B1 | 3/2002 | Blankenship |
| 6,479,792 B1 | 11/2002 | Beiermann |
| 6,486,439 B1 | 11/2002 | Spear |
| 6,515,259 B1 | 2/2003 | Hsu |
| 6,559,416 B1 | 5/2003 | Steenis |
| 6,583,386 B1 | 6/2003 | Ivkovich |
| 6,596,970 B2 | 7/2003 | Blankenship |
| 6,624,388 B1 | 9/2003 | Blankenship et al. |
| 6,642,482 B2 | 11/2003 | Rappl |
| 6,670,579 B2 | 12/2003 | Davidson |
| 6,707,001 B1 | 3/2004 | Ulrich |
| 6,710,297 B1 | 3/2004 | Artelsmair |
| 6,720,529 B2 | 4/2004 | Davidson |
| 6,744,012 B2 | 6/2004 | Ueda |
| 6,747,247 B2 | 6/2004 | Holverson |
| 6,849,828 B2 | 2/2005 | Aigner |
| 6,906,284 B2 | 6/2005 | Kim |
| 6,909,067 B2 | 6/2005 | Davidson |
| 6,933,466 B2 | 8/2005 | Hutchison |
| 6,958,263 B2 | 10/2005 | Bhattacharyya |
| 6,974,931 B2 | 12/2005 | Holverson |
| 6,974,932 B2 | 12/2005 | Holverson |
| 6,984,806 B2 | 1/2006 | Huismann |
| 6,995,338 B2 | 2/2006 | Hutchison |
| 7,002,103 B2 | 2/2006 | Holverson |
| 7,105,775 B2 | 9/2006 | Giese |
| 7,129,443 B2 | 10/2006 | Davidson |
| 7,145,101 B2 | 12/2006 | Tong |
| 7,244,905 B2 | 7/2007 | Das |
| 7,265,320 B2 | 9/2007 | Ou |
| 7,304,269 B2 | 12/2007 | Fulmer |
| 7,307,240 B2 | 12/2007 | Holverson |
| 7,351,933 B2 | 4/2008 | Huismann |
| 7,381,923 B2 | 6/2008 | Gordon |
| 7,576,300 B2 | 8/2009 | Giese |
| 7,626,139 B2 | 12/2009 | Matsuguchi |
| 7,683,290 B2 | 3/2010 | Daniel |
| 8,203,100 B2 | 6/2012 | Ueda |
| 8,288,686 B2 | 10/2012 | Kaufman |
| 8,304,693 B2 | 11/2012 | Ma |
| 8,357,877 B2 | 1/2013 | Ma |
| 8,487,215 B2 | 7/2013 | Holverson |
| 8,604,388 B2 | 12/2013 | Dingeldein |
| 9,095,928 B2 | 8/2015 | Ash |
| 9,162,312 B2 | 10/2015 | Ma |
| 9,193,004 B2 | 11/2015 | Enyedy |
| 9,193,005 B2 | 11/2015 | Ma |
| 9,227,262 B2 | 1/2016 | Wiryadinata |
| 9,233,432 B2 | 1/2016 | Zhang |
| 9,403,231 B2 | 8/2016 | Hutchison |
| 9,409,250 B2 | 8/2016 | Daniel |
| 9,463,523 B2 | 10/2016 | Roth |
| 9,539,662 B2 | 1/2017 | Hutchison |
| 9,669,486 B2 | 6/2017 | Dingeldein |
| 9,862,050 B2 | 1/2018 | Cole |
| 9,950,383 B2 | 4/2018 | Davidson |
| 2002/0008095 A1 | 1/2002 | Norrish |
| 2002/0045970 A1 | 4/2002 | Krause |
| 2002/0107825 A1 | 8/2002 | Manicke |
| 2002/0117487 A1 | 8/2002 | Corby |
| 2002/0117488 A1 | 8/2002 | Amdt |
| 2003/0010756 A1 | 1/2003 | Enyedy |
| 2003/0058149 A1 | 3/2003 | Jayadeva |
| 2004/0010342 A1 | 1/2004 | Thelen |
| 2004/0069759 A1 | 4/2004 | Davidson |
| 2004/0182828 A1 | 9/2004 | Schmidt |
| 2004/0222204 A1 | 11/2004 | Hutchison |

(56) References Cited

U.S. PATENT DOCUMENTS

| | | |
|---|---|---|
| 2004/0238511 A1 | 12/2004 | Matus |
| 2005/0072762 A1 | 4/2005 | Delgado |
| 2005/0082268 A1 | 4/2005 | Lajoie |
| 2005/0184039 A1 | 8/2005 | Stava |
| 2005/0218132 A1 | 10/2005 | Wells |
| 2005/0269306 A1 | 12/2005 | Fulmer |
| 2006/0138115 A1 | 6/2006 | Norrish |
| 2006/0163227 A1 | 7/2006 | Hillen et al. |
| 2006/0163229 A1 | 7/2006 | Hutchison |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0235434 A1 | 10/2007 | Davidson |
| 2007/0267394 A1 | 11/2007 | Beck |
| 2008/0053978 A1 | 3/2008 | Peters |
| 2008/0264916 A1 | 10/2008 | Nagano |
| 2008/0264917 A1 | 10/2008 | White |
| 2008/0264923 A1 | 10/2008 | White |
| 2009/0026188 A1 | 1/2009 | Schorghuber |
| 2009/0039066 A1 | 2/2009 | Centner |
| 2009/0173726 A1 | 7/2009 | Davidson |
| 2009/0215302 A1 | 8/2009 | Roberts |
| 2010/0012637 A1 | 1/2010 | Jaegar |
| 2010/0059493 A1 | 3/2010 | McAninch |
| 2010/0096373 A1 | 4/2010 | Hillen |
| 2010/0096436 A1 | 4/2010 | Nangle |
| 2010/0133250 A1 | 6/2010 | Sardy |
| 2010/0176104 A1 | 7/2010 | Peters |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0204035 A1 | 8/2011 | Grossauer |
| 2011/0297658 A1 | 8/2011 | Peters |
| 2011/0248007 A1 | 10/2011 | Takeda |
| 2011/0266269 A1 | 11/2011 | Kachline |
| 2012/0024828 A1 | 2/2012 | Oowaki |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0285932 A1 | 11/2012 | Yuan |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1 | 5/2013 | Hutchison |
| 2013/0213942 A1 | 8/2013 | Peters |
| 2013/0264323 A1 | 10/2013 | Daniel |
| 2013/0270245 A1 | 10/2013 | Holverson |
| 2014/0008328 A1 | 1/2014 | Enyedy |
| 2014/0008331 A1 | 1/2014 | Ogborn |
| 2014/0008334 A1* | 1/2014 | Ash .................. B23K 26/20 219/121.64 |
| 2014/0008339 A1 | 1/2014 | Ogborn |
| 2014/0008343 A1 | 1/2014 | Ash |
| 2014/0008344 A1 | 1/2014 | Enyedy |
| 2014/0008354 A1 | 1/2014 | Pletcher |
| 2014/0021183 A1 | 1/2014 | Peters |
| 2014/0021186 A1 | 1/2014 | Denney |
| 2014/0021187 A1 | 1/2014 | Denney |
| 2014/0021188 A1 | 1/2014 | Denney |
| 2014/0034621 A1 | 2/2014 | Daniel |
| 2014/0034622 A1 | 2/2014 | Barrett |
| 2014/0035279 A1 | 2/2014 | Narayanan |
| 2014/0042129 A1 | 2/2014 | Daniel |
| 2014/0042138 A1 | 2/2014 | Matthews |
| 2014/0048524 A1 | 2/2014 | Ash |
| 2014/0116994 A1 | 5/2014 | Peters |
| 2014/0131321 A1 | 5/2014 | Enyedy |
| 2014/0158669 A1 | 6/2014 | Davidson |
| 2014/0177109 A1 | 6/2014 | Curtis |
| 2014/0183176 A1 | 7/2014 | Hutchison |
| 2014/0217077 A1* | 8/2014 | Davidson ............ B23K 9/1043 219/130.33 |
| 2014/0251971 A1 | 9/2014 | Hearn |
| 2014/0263193 A1 | 9/2014 | Denney |
| 2014/0263194 A1 | 9/2014 | Narayanan |
| 2014/0263228 A1 | 9/2014 | Peters |
| 2014/0263229 A1 | 9/2014 | Peters |
| 2014/0263230 A1 | 9/2014 | Peters |
| 2014/0263231 A1 | 9/2014 | Peters |
| 2014/0263234 A1 | 9/2014 | Peters |
| 2014/0263237 A1 | 9/2014 | Daniel |
| 2014/0263241 A1 | 9/2014 | Henry |
| 2014/0263243 A1 | 9/2014 | Marschke |
| 2014/0263251 A1 | 9/2014 | Enyedy |
| 2014/0319103 A1 | 10/2014 | Stabb et al. |
| 2014/0326706 A1* | 11/2014 | Dunahoo ............... B23K 9/173 219/137.2 |
| 2014/0367370 A1 | 12/2014 | Hutchison |
| 2014/0374391 A1 | 12/2014 | Cole |
| 2015/0001184 A1 | 1/2015 | Cole |
| 2015/0001197 A1 | 1/2015 | Marschke |
| 2015/0014283 A1 | 1/2015 | Peters |
| 2015/0028010 A1 | 1/2015 | Peters |
| 2015/0028011 A1 | 1/2015 | Peters |
| 2015/0028012 A1 | 1/2015 | Peters |
| 2015/0083702 A1 | 3/2015 | Scott |
| 2015/0090703 A1 | 4/2015 | Peters |
| 2015/0105898 A1 | 4/2015 | Adams |
| 2015/0151375 A1 | 6/2015 | Peters |
| 2015/0158105 A1 | 6/2015 | Peters |
| 2015/0158106 A1 | 6/2015 | Peters |
| 2015/0158107 A1 | 6/2015 | Latessa |
| 2015/0158108 A1 | 6/2015 | Peters |
| 2015/0183044 A1 | 7/2015 | Peters |
| 2015/0183045 A1 | 7/2015 | Peters |
| 2015/0209889 A1 | 7/2015 | Peters |
| 2015/0209905 A1 | 7/2015 | Matthews |
| 2015/0209906 A1 | 7/2015 | Denney et al. |
| 2015/0209907 A1 | 7/2015 | Narayanan |
| 2015/0209908 A1 | 7/2015 | Peters |
| 2015/0209910 A1 | 7/2015 | Denney |
| 2015/0209913 A1 | 7/2015 | Denney |
| 2015/0213921 A1 | 7/2015 | Koide |
| 2015/0251275 A1 | 9/2015 | Denney et al. |
| 2015/0273612 A1 | 10/2015 | Peters |
| 2015/0283638 A1 | 10/2015 | Henry |
| 2015/0283639 A1 | 10/2015 | Henry |
| 2016/0074954 A1 | 3/2016 | Marschke |
| 2016/0074973 A1 | 3/2016 | Kachline |
| 2016/0144444 A1 | 5/2016 | Davidson |
| 2016/0167151 A1 | 6/2016 | Mehn |
| 2016/0175975 A1 | 6/2016 | Lattner |
| 2016/0199939 A1 | 7/2016 | Hartman |
| 2016/0221105 A1 | 8/2016 | Henry |
| 2016/0288235 A1 | 10/2016 | Davidson |
| 2016/0318112 A1 | 11/2016 | Hutchison |
| 2017/0080512 A1 | 3/2017 | Centner |
| 2017/0165778 A1 | 6/2017 | Hsu |
| 2017/0225255 A1 | 8/2017 | Zwayer |
| 2018/0236585 A1 | 8/2018 | Davidson |
| 2018/0333798 A1 | 11/2018 | Uecker |
| 2018/0354052 A1 | 12/2018 | Schartner |
| 2018/0354057 A1 | 12/2018 | Sigl |
| 2018/0354075 A1 | 12/2018 | Liu |

FOREIGN PATENT DOCUMENTS

| | | |
|---|---|---|
| CA | 2883947 | 3/2014 |
| CN | 2125475 | 12/1992 |
| CN | 2181354 | 11/1994 |
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |

(56) References Cited

FOREIGN PATENT DOCUMENTS

| | | |
|---|---|---|
| CN | 101062530 | 10/2007 |
| CN | 201098775 | 8/2008 |
| CN | 101376191 | 3/2009 |
| CN | 201249331 | 6/2009 |
| CN | 101804495 | 8/2010 |
| CN | 101862886 | 10/2010 |
| CN | 102059476 | 5/2011 |
| CN | 102470473 | 5/2012 |
| CN | 102554418 | 7/2012 |
| CN | 102596475 | 7/2012 |
| CN | 102770228 | 11/2012 |
| CN | 102825370 | 12/2012 |
| CN | 202824943 | 3/2013 |
| CN | 104968465 | 10/2015 |
| DE | 2501928 | 7/1976 |
| DE | 19808383 | 9/1999 |
| DE | 212004000048 | 6/2006 |
| EP | 0150543 | 8/1985 |
| EP | 0194045 | 9/1986 |
| EP | 0204559 | 12/1986 |
| EP | 038722 | 9/1990 |
| EP | 0936019 A2 | 8/1999 |
| EP | 0936019 A3 | 3/2001 |
| EP | 1232825 | 8/2002 |
| EP | 2218537 | 8/2010 |
| EP | 2286949 | 2/2011 |
| EP | 2322315 | 5/2011 |
| EP | 2522453 | 11/2012 |
| EP | 2892680 | 7/2015 |
| EP | 2781291 | 10/2015 |
| FR | 1443701 | 6/1966 |
| JP | S5719166 | 2/1982 |
| JP | S57109573 | 7/1982 |
| JP | S583784 | 1/1983 |
| JP | S58119466 | 7/1983 |
| JP | S60108175 | 6/1985 |
| JP | S60108176 | 6/1985 |
| JP | S60170577 | 9/1985 |
| JP | 61186172 | 8/1986 |
| JP | S629773 | 1/1987 |
| JP | S6471575 | 3/1989 |
| JP | H03285768 | 12/1991 |
| JP | H06277840 | 10/1994 |
| JP | H07204848 | 8/1995 |
| JP | H1097327 | 4/1998 |
| JP | H11156542 | 6/1999 |
| JP | 2001276971 | 10/2001 |
| JP | 2003205385 | 7/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| JP | 2014176890 | 9/2014 |
| KR | 1020060133016 | 12/2006 |
| KR | 20080009816 | 1/2008 |
| KR | 20100120562 | 11/2010 |
| KR | 1020120027764 | 3/2012 |
| KR | 101497460 | 3/2015 |
| SU | 872102 | 10/1981 |
| WO | 9640465 | 12/1996 |
| WO | 0132347 | 5/2001 |
| WO | 0153030 | 7/2001 |
| WO | 2005030422 | 4/2005 |
| WO | 2014140783 | 9/2014 |
| WO | 2015125008 | 8/2015 |

OTHER PUBLICATIONS

Pitrun, "The Effect of Welding Parameters on Levels of Diffusible Hydrogen in Weld Metal Deposited Using Gas Shield Rutile Flux Cored Wires," University of Wollongong Thesis Collection, Published in 2004, 367 pages.

Gupta et al., "A Low Temperature Hydrogen Sensor Based on Palladium Nanoparticles," Sensors and Actuators B: Chemical, vol. 196, Feb. 5, 2014, 8 pages.

Lincoln Electric, "Storing and Redrying Electrodes," Published in 2011, retrieved on Sep. 17, 2019, 5 pages.

Non-Final Office Action U.S. Appl. No. 15/498,249 dated Sep. 23, 2019, 43 pages.

International Searching Authority, "International Search Report and Written Opinion," issued in connection with International Patent Application PCT/US2019/050972, dated Nov. 14, 2019, 13 pages.

Int'l Search Report and Written Opinion for PCT/US2018/036852 dated Oct. 2, 2018 (17 pgs.).

N.A.: "Drahtgluhe", Aug. 23, 2016 (Aug. 23, 2016), XP055510057, Wikipedia, Retrieved from the Internet: URL:https://de.wikipedia.Org/w/index.php7title=Drahtgl%C3%BChe&oldid=157333005, [retrieved on Sep. 26, 2018], with machine translation, 2 pages.

Int'l Search Report and Written Opinion for PCT/US2018/036898 dated Oct. 1, 2018 (14 pgs.).

Int'l Search Report and Written Opinion for PCT/US2018/036900 dated Oct. 5, 2018 (15 pgs.).

Int'l Search Report and Written Opinion for PCT/US2018/049888 dated Feb. 1, 2019 (14 pgs.).

Int'l Search Report and Written Opinion for PCT/US2018/052384 dated Feb. 12, 2019 (12 pgs.).

Non-Final Office Action U.S. Appl. No. 15/343,992 dated Mar. 7, 2019 (18 pgs.).

Int'l Search Report and Written Opinion for PCT/US2016/065265 dated Mar. 14, 2017 (16 pages).

International Search Report from PCT Application No. PCT/US2014/055529, dated Mar. 6, 2015, 9 pgs.

International Search Report from PCT application No. PCT/US2013/073863 dated May 2, 2014, 15 pgs.

International Search Report from PCT application No. PCT/US2014/014241 dated May 9, 2014, 8 pgs.

PCT International Search Report & Written Opinion of PCT/US2012/063783 dated Mar. 1, 2013, 12 pages.

International Search Report from PCT application No. PCT/US2013/077710 dated May 9, 2014, 12 pgs.

International Search Report from PCT application No. PCT/US2013/073490 dated May 13, 2014, 10 pgs.

International Search Report from PCT application No. PCT/US2014/017864, dated Aug. 22, 2014, 9 pgs.

International Search Report from PCT application No. PCT/US2014/045872, dated Nov. 4, 2014, 10 pgs.

International Search Report from PCT application No. PCT/US2014/041201, dated Nov. 4, 2014, 11 pg.

International Search Report from PCT application No. PCT/US2015/045715, dated Jan. 7, 2016, 12 pgs.

International Search Report from PCT application No. PCT/US2015/055040, dated Feb. 3, 2016, 11 pgs.

International Search Report from PCT application No. PCT/US2015/056121, dated Apr. 4, 2016, 11 pgs.

International Search Report from PCT application No. PCT/US2016/017385, dated Jul. 19, 2016, 13 pgs.

Bondy et al., "Graph Theory with Applications," Department of Combinatorics and Optimization, University of Waterloo, 1976, p. 7-8.

"ALT 304," Miller—The Power of Blue, Jun. 2001.

"Maxstar 200 SD, DX, and LX," Miller Electric Mfg. Co., Oct. 2003.

Office Action from U.S. Appl. No. 15/498,249 dated Apr. 20, 2018.

Int'l Search Report and Written Opinion for PCT/US2018/029770 dated Sep. 12, 2018 (13 pgs.).

Int'l Search Report and Written Opinion for PCT/US2018/036915 dated Oct. 1, 2018 (15 pgs).

Int'l Search Report and Written Opinion for PCT/US2018/036914 dated Oct. 2, 2018 (14 pgs.).

Int'l Search Report and Written Opinion for PCT/US2018/036906 dated Oct. 1, 2018 (15 pgs.).

Int'l Search Report and Written Opinion for PCT/US2018/036919 dated Oct. 2, 2018 (13 pgs.).

Int'l Search Report and Written Opinion for PCT/US2018/035087 dated Sep. 19, 2018 (15 pgs.).

(56) References Cited

OTHER PUBLICATIONS

Int'l Search Report and Written Opinion Appln No. PCT/U2019/049109 dated Dec. 2, 2019, 11 pages.
PCT, IPRP, issued in connection with PCT/US2018/036898, dated Dec. 19, 2019, 7 pages.
PCT, IPRP, issued in connection with PCT/US2018/036900, dated Dec. 19, 2019, 7 pages.
Int'l Search Report and Written Opinion Appln No. PCT/U2019/067491 dated Jun. 25, 2020, 17 pages.
European Office Action Appln No. 20164462.2 dated Sep. 7, 2020, 8 pages.
European Office Action Appln No. 18735144.0 dated Dec. 18, 2020. 4 pages.
European Office Action Appln No. 18735144.0 dated Dec. 21, 2020, 4 pages.

\* cited by examiner

SYSTEMS, METHODS, AND APPARATUS FOR CONTROL OF WIRE PREHEATING IN WELDING-TYPE SYSTEMS

TECHNICAL FIELD

The present disclosure generally relates to welding-type systems and, more particularly, to control of preheating in welding-type systems.

BACKGROUND

Welding is, at its core, simply a way of fusing two pieces of metal. Arc welding uses electrical power as a source of heat to melt and bond a metal wire (and/or welding electrode) to a metal workpiece. Electrical current is routed through a circuit that includes the electrode and workpiece. The current creates an electrical arc that melts the welding wire and the workpiece to form the desired weld.

Arc welding performance may vary depending upon whether a weld is made with a "cold" or "hot" electrode wire. In general, an electrode may be considered cold when the electrode is at or relatively near the ambient temperature. An electrode may be considered hot, by contrast, when the electrode is at a much more elevated temperature. In some applications, it is believed that welding is facilitated when the electrode wire is hot (and/or preheated).

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to systems and methods for control of wire preheating in welding-type systems, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
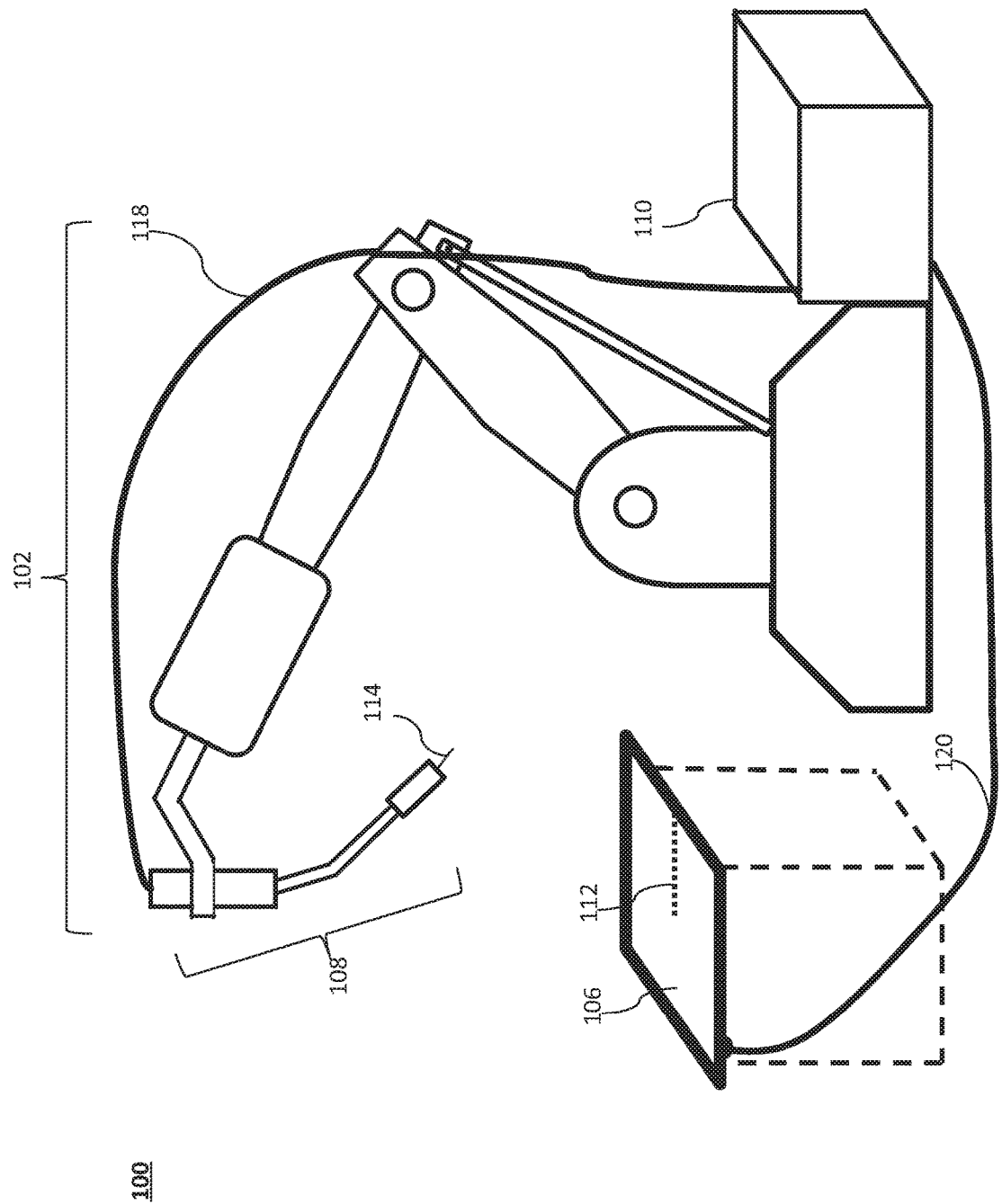
FIG. 1 illustrates an example robotic welding system, in accordance with aspects of this disclosure.

The figures are not necessarily to scale. Where appropriate, the same or similar reference numerals are used in the figures to refer to similar or identical elements. For example, reference numerals utilizing lettering (e.g., welding power supply 212a, preheating power supply 212b) refer to instances of the same reference numeral that does not have the lettering (e.g., power supply 212).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

As used herein, welding-type power refers to power suitable for welding, cladding, brazing, plasma cutting, induction heating, carbon arc cutting (CAC-A), and/or hot wire welding/preheating (including laser welding and laser cladding), carbon arc cutting or gouging, and/or resistive preheating.

As used herein, welding wire and/or electrode wire refers to a wire, or strip electrode, suitable for welding, cladding, brazing, plasma cutting, and/or carbon arc cutting or gouging.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating of an electrode wire in a travel path of the electrode wire prior to a welding arc and/or deposition on a weldment.

As used herein, a welding wire characteristic refers to a wire type (e.g., brand name, model name, model number, industry classification, wire construction [e.g., solid, cored, seamless cored, strip, etc]), wire dimensions (e.g., solid wire diameter, wire core diameter, width, sheath thickness, etc), wire material (e.g., alloy, solid wire material, wire core material, wire sheath material, flux compounds, metal-powder compounds, moisture content, hydrogen content, etc.), wire plating/coating material, and/or wire lubricant.

As used herein, criticality of a welding characteristic refers to an importance and/or impact of the welding characteristic on column strength of the wire, wire feedability, weld process stability, finished weldment metallurgy (e.g., hydrogen cracking, dilution, etc.), and/or welding consumable longevity.

As used herein, a degradation and/or deformation temperature refers to a temperature at which a material begins to substantially degrade and/or deform (e.g., such as by softening, melting, gumming, vaporizing, changing viscosity, etc.).

As used herein, governing characteristic refers to the welding wire characteristic used to determine a threshold temperature or target temperature (e.g., the welding wire characteristic with the lowest and/or highest degradation/deformation temperature, and/or highest criticality).

Some examples of the present disclosure relate to a welding-type system, comprising a wire preheater configured to heat a welding wire between a wire supply of the welding wire and deposition of the welding wire on a weldment, and control circuitry configured to determine a governing characteristic of the welding wire, determine at least one of a threshold preheat temperature or a target preheat temperature based on the governing characteristic, and control the wire preheater to heat the welding wire based on the threshold preheat temperature or the target preheat temperature.

In some examples, the control circuitry is configured to determine the governing characteristic based on one or more of a wire type, wire diameter, wire sheath thickness, wire material, wire plating material, or wire lubricant. In some examples, one or more of the wire type, wire diameter, wire sheath thickness, wire material, wire plating material, or wire lubricant is entered by a user or automatically determined by the control circuitry. In some examples, the control circuitry is further configured to determine one or more characteristics of the welding wire, determine a criticality of the one or more characteristics, and determine the governing characteristic based on the one or more characteristics and the criticality of the one or more characteristics. In some examples, the control circuitry is configured to determine the threshold preheat temperature or the target preheat temperature based on a homologous temperature of the governing characteristic. In some examples, the threshold preheat temperature comprises a threshold above which the governing characteristic would experience degradation, or deformation, that would impact a column strength of the welding wire, a feedability of the welding wire, a stability of a welding process, or a longevity of a welding consumable. In some examples, the preheater comprises a plurality of contact tips, a contact tip and a wire supply roller, or a focused energy source. In some examples, the welding-type system further comprises a welding torch having a torch contact tip, and the wire supply, the wire supply configured to feed the welding wire to the welding torch, the wire preheater configured to heat the welding wire between the wire supply and the torch contact tip.

Some examples of the present disclosure relate to a method of preheating a welding wire, the method comprising, determining, via control circuitry, a governing characteristic of the welding wire, determining, via control circuitry, at least one of a threshold preheat temperature or a target preheat temperature based on the governing characteristic, and heating the welding wire to a non-zero temperature based on the threshold preheat temperature or the target preheat temperature.

In some examples, determining the governing characteristic comprises identifying a degradation temperature of one or more of a wire type, wire diameter, wire sheath thickness, wire material, wire plating material, or wire lubricant. In some examples, the method further comprises automatically identifying one or more of the wire type, wire diameter, wire sheath thickness, wire material, wire plating material, or wire lubricant via control circuitry. In some examples, the method further comprises receiving user identification of one or more of the wire type, wire diameter, wire sheath thickness, wire material, wire plating material, or wire lubricant via a user interface. In some examples, determining the threshold preheat temperature or the target preheat temperature is further based on a homologous temperature of the governing characteristic. In some examples, the method further comprises determining one or more characteristics of the welding wire, determining a criticality of the one or more characteristics, and determining the governing characteristic based on the one or more characteristics and the criticality of the one or more characteristics.

Some examples of the present disclosure relate to a wire preheating power supply, comprising power conversion circuitry configured to convert input power to preheating power and output the preheating power to a wire preheater, and control circuitry configured to determine one or more characteristics of a welding wire, determine a governing characteristic of the one or more characteristics, determine at least one of a temperature threshold or a target temperature based on the governing characteristic, and control the power conversion circuitry or wire preheater to preheat the welding wire to a temperature above or below the temperature threshold, or to a temperature approximately equal to the target temperature.

In some examples, the control circuitry is configured to determine the governing characteristic based on one or more degradation or deformation temperatures of the one or more characteristics. In some examples, the control circuitry is configured to determine a criticality of the one or more characteristics, and determine the governing characteristic based on the criticality of the characteristics. In some examples, the control circuitry is further configured to determine an actual preheat temperature of the welding wire and control the power conversion circuitry in response to the actual preheat temperature being above the target temperature or the threshold temperature. In some examples, the control circuitry is further configured to determine an actual preheat temperature of the welding wire and control the power conversion circuitry to increase the preheating power in response to the actual preheat temperature being below the target temperature or the threshold temperature. In some examples, the control circuitry is further configured to determine an actual preheat temperature of the welding wire and control the power conversion circuitry to decrease the preheating power in response to the actual preheat temperature being above the target temperature or the threshold temperature.

Some examples of the present disclosure relate to welding-type systems that use one or more preheaters to heat welding wire prior to a welding arc and/or deposition on a weldment. More particularly, some examples of the present disclosure relate to control of the preheaters based on a governing characteristic of the welding wire. The preheating control serves to prevent degradation and/or deformation of the welding wire by determining a governing characteristic of the welding wire (i.e., a "weakest link"), and establishing one or more preheat temperature thresholds and/or target temperatures based on this governing characteristic.

In conventional preheating systems, welding wire characteristics are rarely considered. Instead, the preheating systems provide a relatively low preheat current to ensure that the welding wire does not melt, regardless of any wire characteristics. Where wire characteristics are considered, the consideration is minimal, such as to determine some property (e.g., cast, helix, etc.) that preheating may help alleviate. Even then, the preheating temperature (and/or preheating power) is kept low enough that there is little risk of approaching a wire degradation and/or deformation temperature that would impact column strength, wire feedability, weld process stability, and/or welding consumable longevity.

As preheating systems advance, however, more heat may be applied to welding wires for hot electrode welding. More heat means more risk of wire degradation, deformation, and/or loss of column strength. For example, too much heat could result in a degradation and/or deformation of a wire sheath. Such degradation and/or deformation may cause a weakening in the column strength of the wire, which may lead to buckling and/or problems with wire feedability, weld process stability, and/or longevity of a welding consumable (e.g., contact tips, gas diffusers, and/or wire liners). For example, a weakened wire may deform and/or become bent, which may cause the wire to strike, abrade, and/or adhere to a welding consumable as the wire travels, causing damage to the consumables, impairing the feeding of the wire, and/or causing the welding operation itself to go awry and/or off course.

In order to avoid wire degradation and/or deformation, a preheating control may analyze one or more welding wire characteristics and control preheating accordingly. For example, the control may analyze a wire and determine there is a wire sheath, wire coating, and/or wire core comprised of different materials with different melting points. Further, the wire may use a lubricant that begins to degrade and/or turn to "gum" when heated to a certain temperature. The preheating system may determine that one of the characteristics is the governing characteristic (i.e., the "weakest link"), such as when that wire characteristic will begin to degrade and/or deform at a lower temperature than the other characteristics, for example.

The preheating system may additionally determine criticality of welding wire characteristics, such as with respect to column strength, wire feedability, weld process stability, and/or longevity of a welding consumable. For example, there may be some wires where the sheath is more critical to the column strength than the core. Additionally, or alternatively, the system may determine that the lubricant used with the wire is more critical to wire feedability, weld process stability, and/or welding consumable longevity than any other characteristic. The system may use the criticality determination to inform (and/or override) its governing characteristic and/or threshold determinations.

In some examples, the wire preheater system of the present disclosure may determine an upper threshold preheat temperature based on the governing characteristic and/or criticality determinations (and/or one or more other determinations), and control the preheater to heat the welding wire to a non-zero temperature below the upper threshold. In some examples, the wire preheater system may determine a lower threshold preheat temperature based on the governing characteristic and/or criticality determinations (and/or one or more other determinations), and control the preheater to heat the welding wire to a non-zero temperature above the lower threshold. In some examples, the wire preheater system may determine a target preheat temperature based on the governing characteristic and/or criticality determinations (and/or one or more other determinations), and control the preheater to heat the welding wire to a non-zero temperature approximately equal to the target preheat temperature. In some examples, the threshold and/or target temperature may be set by (and/or overridden by) an operator, such as based on previous knowledge, experimentation, and/or guidance, for example.

FIG. 1 shows an example welding system 100. In some examples, the welding system 100 forms a weld (e.g., at weld joint 112) between two components in a weldment by any known welding techniques. Known welding techniques include, inter alia, shielded metal arc welding (SMAW), metal inert gas (MIG), flux-cored arc welding (FCAW), tungsten inert gas (TIG), laser welding, sub-arc welding (SAW), stud welding, friction stir welding, and/or resistance welding.

In the example of FIG. 1, a robot 102 is used to form the weld joint 112 on a workpiece 106 using a welding torch 108, such as the illustrated bent-neck (i.e., gooseneck design) welding torch (or, when under manual control, a handheld torch). In some examples, the welding torch 108 may be, for example, a TIG torch, a MIG torch, or a flux cored torch (commonly called a MIG "gun"). In the example of FIG. 1, the torch 108 uses an electrode wire 114 to form the weld joint 112. The electrode wire 114 may be tubular-type electrode, a strip electrode, a solid type wire, a flux-core wire, a seamless metal core wire, aluminum wire, solid gas metal arc welding (GMAW) wire, composite GMAW wire, gas-shielded FCAW wire, SAW wire, self-shielded wire and/or any other type of electrode wire. In some examples, a human operator may form the weld joint 112 using the weld torch 108 (or a different weld torch) instead of the robot 102.

In the example of FIG. 1, power is delivered to the welding torch 108 (and/or electrode wire 114) by welding equipment 110 via conduit 118. As shown, the electrode wire 114 is also delivered to the welding torch 108 by welding equipment 110 via conduit 118. In some examples, the electrode wire 114 may be otherwise delivered to the welding torch 108. Power is returned to the welding equipment 110 by way of a work return conduit 120, thereby completing the welding circuit.

The welding equipment 110 may comprise, inter alia, one or more power sources (each generally referred to herein as a "power supply"), a source of a shield gas, a wire feeder, and/or other devices. Other devices may include, for example, water coolers, fume extraction devices, one or more controllers, sensors, user interfaces, communication devices (wired and/or wireless), etc. In some examples, the one or more power supplies may provide a direct current (DC), alternating current (AC), or a combination thereof. In operation, current from the welding equipment 110 traverses the wire electrode 114 and creates an arc between the wire electrode 114 and workpiece 106. Energy from the arc melts the electrode 114 and/or workpiece 106 to create the weldment and/or weld joint 112.

In some examples, a preheater may preheat the wire electrode 114 prior to the arc and/or weldment. Preheating may have several advantages, such as more uniform spray and/or streaming spray, reduction in out-gassing events and/or very fine spatter-causing events, reduction of wire cast, alleviating wire flip, etc. As will be discussed below, the welding torch 108 may employ a contact tip assembly (and/or other assembly, such as a focused energy assembly, for example) that heats the electrode wire 114 prior to formation of the welding arc.

Figure 2:
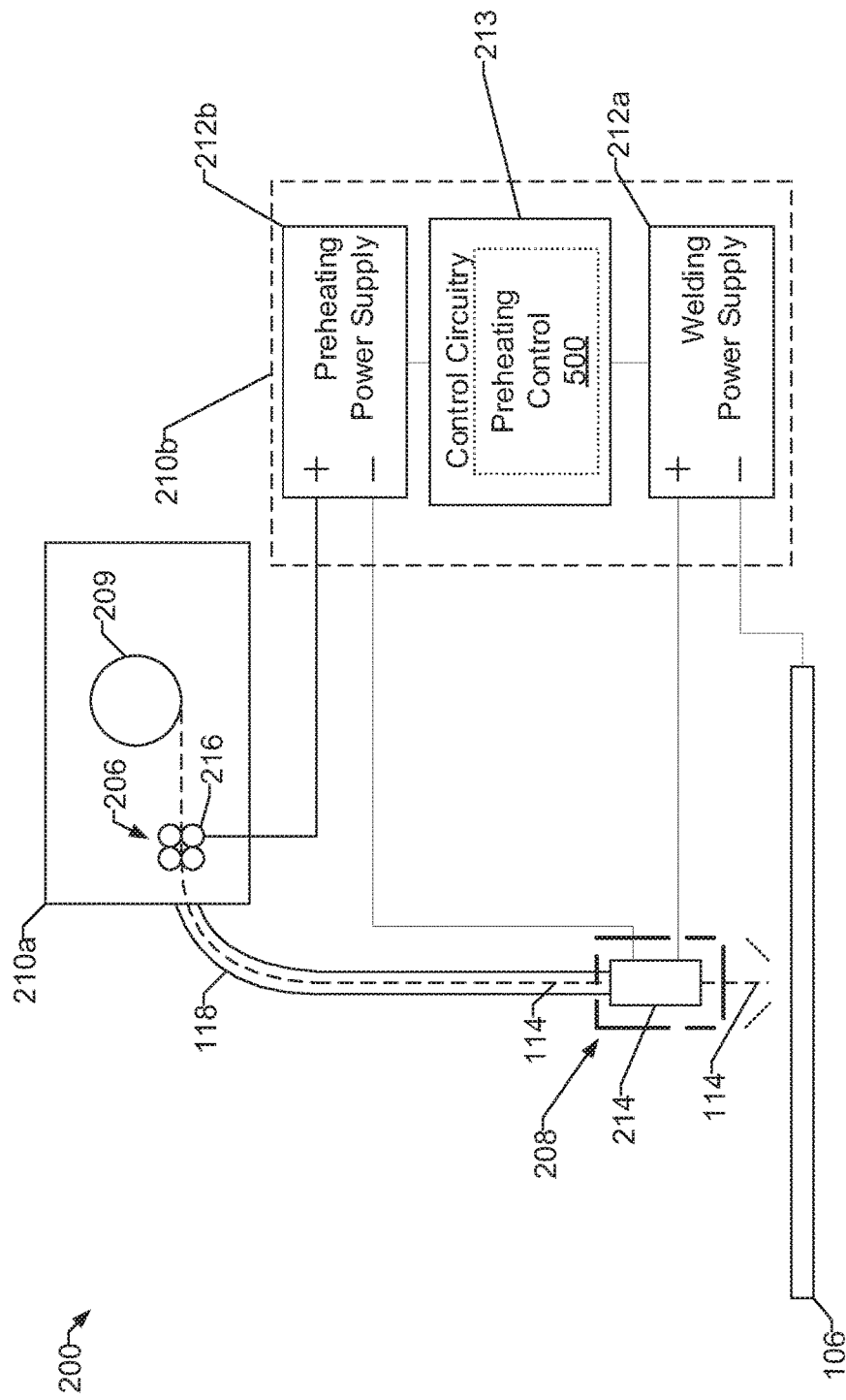
FIG. 2 illustrates an example preheating system that uses a wire feeder, power supply, and torch assembly to apply preheating to a welding wire, in accordance with aspects of this disclosure.

FIG. 2 illustrates an example preheating system 200. As shown, the preheating system 200 includes a torch assembly 208. In some examples, the torch assembly 208 comprises some or all of the welding torch 108 of FIG. 1. In the example of FIG. 2, the torch assembly 208 includes a contact tip 214 that receives the electrode wire 114 via conduit 118 from a wire feeder 210a. In some examples, the wire feeder 210a comprises all or part of the welding equipment 110 of FIG. 1.

In the example of FIG. 2, the wire feeder 210a includes a wire spool 209 storing the electrode wire 114 and a wire drive 206 configured to drive (and/or move, pull, push, etc.) the electrode wire 114. As shown, the wire drive 206 includes one or more rollers 216 (e.g., an idle roller and a drive roller). In some examples, the wire drive 206 pulls the electrode wire 114 from the wire spool 209 and feeds the electrode wire 114 to the torch assembly 208 via conduit 118.

In the example of FIG. 2, the torch assembly 208 receives power from a power supply 210b. In some examples, the power supply 210b may comprise some or all of the welding equipment 110 of FIG. 1. In the example of FIG. 2, the power supply 210b includes a welding power supply 212a and a preheating power supply 212b. As shown, the welding power supply 212a and the preheating power supply 212b have separate power outputs. In some examples, the preheating power supply 212b may comprise an auxiliary power output of the power supply 210b, while the welding power supply 212a may comprise a welding-type power output of the power supply 210b.

In the example of FIG. 2, a positive polarity terminal of the welding power supply 212a connects to the contact tip 214, while a negative polarity terminal of the welding power supply 212a connects to the workpiece 106. The terminal connections of the welding power supply 212a create a circuit that allows for welding-type electrical power to be delivered to the electrode wire 114 from the welding power supply 212a. The welding-type electrical power is configured to produce an arc between the contact tip 214 and workpiece 106, so as to melt the electrode wire 114 and produce the weld joint 112 on the workpiece 106. While the welding-type power supply is shown as connecting to the contact tip 214 externally for clarity in FIG. 2, in practice, the connection may actually be made internally, such as via the conduit 118, for example. In some examples, the positive and negative polarity terminal connections of the welding power supply 212a may be reversed.

In the example of FIG. 2, a negative polarity terminal of the preheating power supply 212b connects to the contact tip 214, while a positive polarity terminal of the preheating power supply 212b connects to the rollers 216 of the wire drive 206. The terminal connections create a preheating circuit that allows the preheating power supply 212b to provide preheating electrical power (and/or preheating electrical current) to the electrode wire 114 between the wire drive 206 and torch assembly 208 (and/or workpiece 106). In some examples, the preheating electrical power is configured to preheat the electrode wire 114 so as to enable hot electrode welding.

In some examples, the positive and negative polarity terminal connections of the preheating power supply 212b may be reversed. In some examples, instead of providing the preheating power via the wire drive 206, the example wire drive 206 may include a contact tip, focused energy source (e.g., a laser), and/or other device through which the preheating power supply 212b provides preheating power to the electrode wire 114. In some examples, one of the terminals of the preheating power supply 212b may instead connect to a contact tip of the wire feeder 210a. In some examples, one of the terminals of the preheating power supply 212b may instead connect to a second contact tip (not shown). In some examples, there may be more than one preheating power supply 212b. While the preheating supply is shown as connecting to the contact tip 214 externally for clarity in FIG. 2, in practice, the connection may actually be made internally, such as via the conduit 118, for example.

As shown in the example of FIG. 2, the welding power supply 212a and/or the preheating power supply 212b are connected to control circuitry 213. In some examples, the control circuitry 213 controls the welding power supply 212a to generate welding-type power, while also controlling the preheating power supply 212b to produce preheating power. In some examples, the control circuitry 213 controls only the preheating power supply 212b. In some examples, a separate control circuitry is used to control the welding power supply 212a. In the example of FIG. 2, the control circuitry 213 includes a preheating control process 500 (discussed further below) configured to control the preheating power supply 212b.

Figure 3:
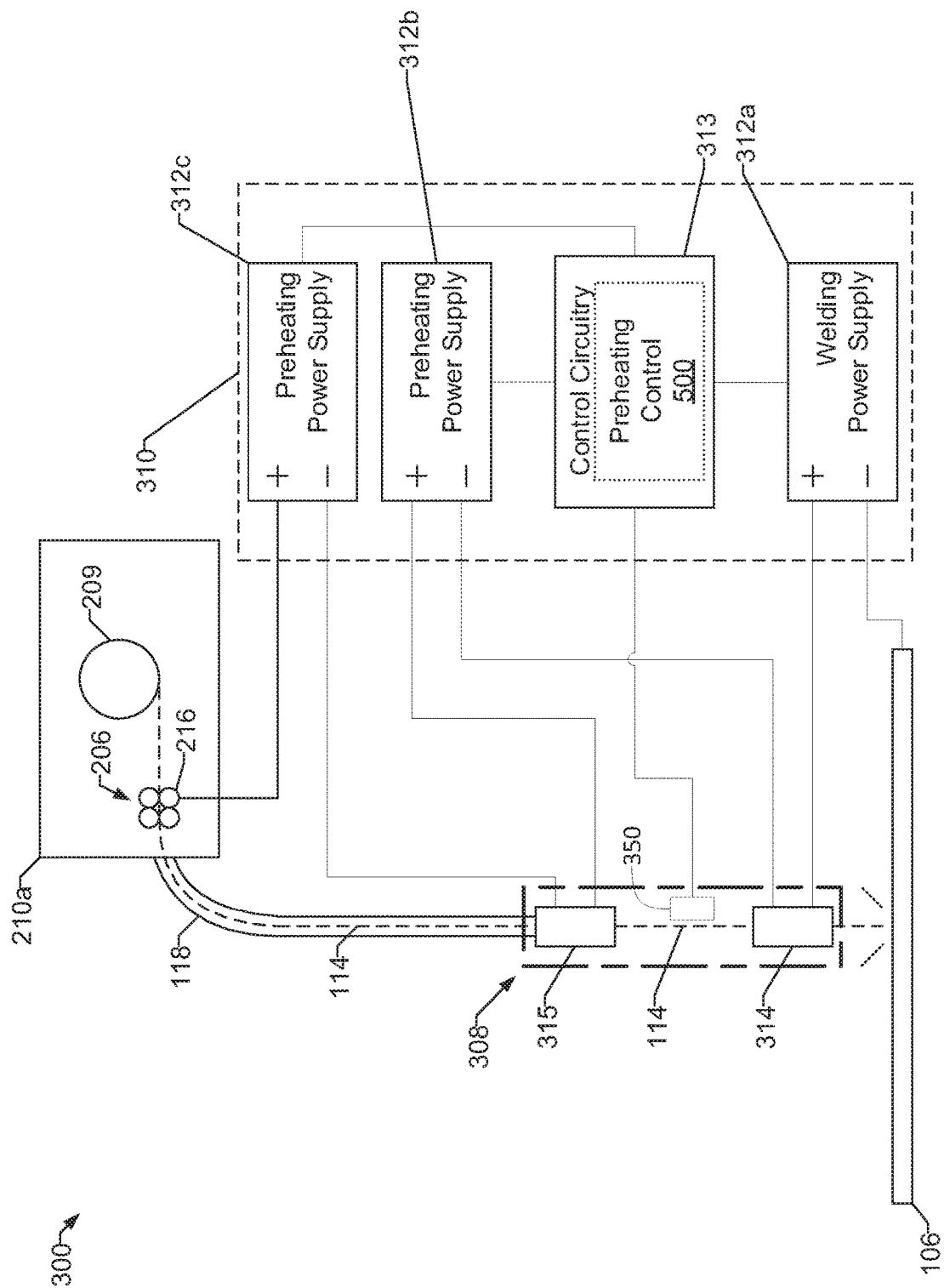
FIG. 3 illustrates another example preheating system that uses a second contact tip in a torch assembly to apply preheating to a welding wire, in accordance with aspects of this disclosure.

FIG. 3 illustrates another example preheating system 300. The preheating system 300 is similar to the preheating system 200. For example, the preheating system 300 includes a wire drive 210a with a wire drive 206 and wire spool 209. The preheating system 300 also includes a torch assembly 308 that receives electrode wire 114 via a conduit 118 from the wire drive 210a. The torch assembly 308 is further connected to a power supply 310. In some examples, the torch assembly 308 comprises some or all of the welding torch 108 of FIG. 1.

In the example of FIG. 3, the torch assembly 308 includes a first contact tip 314 and a second contact tip 315. The first contact tip 314 and second contact tip 315 comprise part of a passage through which the electrode wire 114 travels when in the welding torch 308. In some examples, the torch assembly 308 may also include a wire guide that guides the wire as it travels through the passage. In some examples, the guide 314 may be fabricated from ceramic, a dielectric material, a glass-ceramic polycrystalline material, and/or another non-conductive material. In some examples, the guide may help to avoid unwanted kinking, buckling, and/or jamming as the electrode wire 114 travels from the second contact tip 315 to the first contact tip 314. In some examples, the torch assembly 308 may further includes a gas diffuser that routes shielding gas to a nozzle that directs the shielding gas to the area around the weld so as to shield the weld from undesirable impurities.

In the example of FIG. 3, the torch assembly 308 further includes a sensor 350 positioned along (and/or proximate to) the passage of the electrode wire 114 within the torch 308. As shown, the sensor 350 is positioned within the torch 308 between the second contact tip 315 and first contact tip 314. In some examples, the sensor 350 may be positioned elsewhere within the torch assembly 308 or outside of the torch assembly 308. In some examples, the sensor 350 is configured to detect thermal conditions of the electrode wire 114 prior to the electrode wire 114 reaching the first contact tip 318. In some examples, the sensor 350 may be a temperature sensor, such as a thermometer and/or thermostat configured to detect thermal conditions of the electrode wire 114 prior to the electrode wire 114 reaching the first contact tip 318. Example thermometers may include both contact sensors and non-contact sensors, such as non-contact infrared temperature sensors, thermistors, and/or thermocouples. In some examples, the sensor 350 may facilitate periodic and/or real-time feedback. In the example of FIG. 3, the sensor 350 is in electrical communication with control circuitry 313 of the power supply 310.

In the example of FIG. 3, the torch assembly 308 receives power from the power supply 310. In some examples, the power supply 310 may comprise some or all of the welding equipment 110 of FIG. 1. In the example of FIG. 3, the power supply 310 includes a welding power supply 312a, a first preheating power supply 312b, and a second preheating power supply 312c. As shown, the welding power supply 312a, first preheating power supply 312b, and second preheating power supply 312c have separate power outputs. In some examples, the first preheating power supply 312b, and/or second preheating power supply 312c may comprise one or more auxiliary power outputs of the power supply 310, while the welding power supply 312a comprises a welding power output of the power supply 310. In some examples, one or more of the welding power supply 312a, first preheating power supply 312b, and/or second preheating power supply 312c may comprise their own individual power supply.

In the example of FIG. 3, a positive polarity terminal of the welding power supply 312a connects to the first contact tip 314. As shown, a negative polarity terminal of the welding power supply 312a connects to the workpiece 106. The terminal connections of the welding power supply 312a create a circuit that allows welding-type electrical power to be delivered to the electrode wire 114 from the welding power supply 312a. The welding-type electrical power is configured to produce an arc between the first contact tip 318 and workpiece 106, so as to melt the electrode wire 114 and/or workpiece 106 to produce the weld joint 112 (e.g., such as shown in FIG. 1) on the workpiece 106. While the welding-type power supply is shown as connecting to the first contact tip 314 externally for clarity in FIG. 3, in practice, the connection may actually be made internally via the conduit 118. In some examples, the positive and negative polarity terminal connections of the welding power supply 312a may be reversed.

In the example of FIG. 3, a negative polarity terminal of the first preheating power supply 312b connects to the first contact tip 314. As shown, a positive polarity terminal of the first preheating power supply 312b connects to the second contact tip 315. The terminal connections create a first preheating circuit that allows the first preheating power supply 312b to provide preheating electrical power (and/or a preheating electrical current) to the electrode wire 114 between the first contact tip 314 and second contact tip 315. The preheating electrical power is configured to preheat the electrode wire 114 so as to enable hot electrode welding.

In some examples, the positive and negative polarity terminal connections of the preheating power supply 212b may be reversed. In some examples, the torch assembly 308 may further include a third contact tip (not shown), and the preheating power supply 312b may have terminals connected to the second contact tip 315 and the third contact tip (and/or appropriate portions of the torch assembly 308 in electrical communication with the second contact tip 315 and the third contact tip). In some examples, instead of providing the preheating power via contact tips, the system 300 may apply preheating power via a focused energy source (e.g., a laser), such as a focused energy source positioned within the torch assembly 308.

In the example of FIG. 3, the preheating system 300 further includes a second preheating power supply 312c that is similar to the preheating power supply 212b of FIG. 2. The second preheating power supply 312c has terminal connections to the second contact tip 315 and rollers 216 of the wire drive 206 to create a second preheating circuit that allows the second preheating power supply 312c to provide preheating power electrical power (and/or preheating electrical current) to the electrode wire 114 between the wire drive 206 and the torch assembly 208 (and/or second contact tip 315).

In some examples, the positive and negative polarity terminal connections of the second preheating power supply 312c may be reversed. In some examples, the first preheating power supply 312b and second preheating power supply 312c may coordinate preheating of the electrode wire 114. In some examples, the second preheating power supply 312c may be omitted entirely.

As shown in the example of FIG. 3, the welding power supply 312a, first preheating power supply 312b, and second preheating power supply 312c are connected to control circuitry 313. As shown, the control circuitry 313 is also connected to the sensor 350, such that the control circuitry 313 may receive thermal feedback from the sensor 350. In some examples, the control circuitry 313 may control the welding power supply 312a to generate welding-type power, while also controlling the first preheating power supply 312b and/or second preheating power supply 312c to produce preheating power. In some examples, the control circuitry 313 may control only the first preheating power supply 312b. In some examples, separate control circuitry may be used to control the second preheating power supply 312c and/or welding power supply 312a. In the example of FIG. 3, the control circuitry 313 includes a preheating control process 500 (discussed further below) configured to control the first preheating power supply 312b and/or second preheating power supply 312c.

Figure 4:
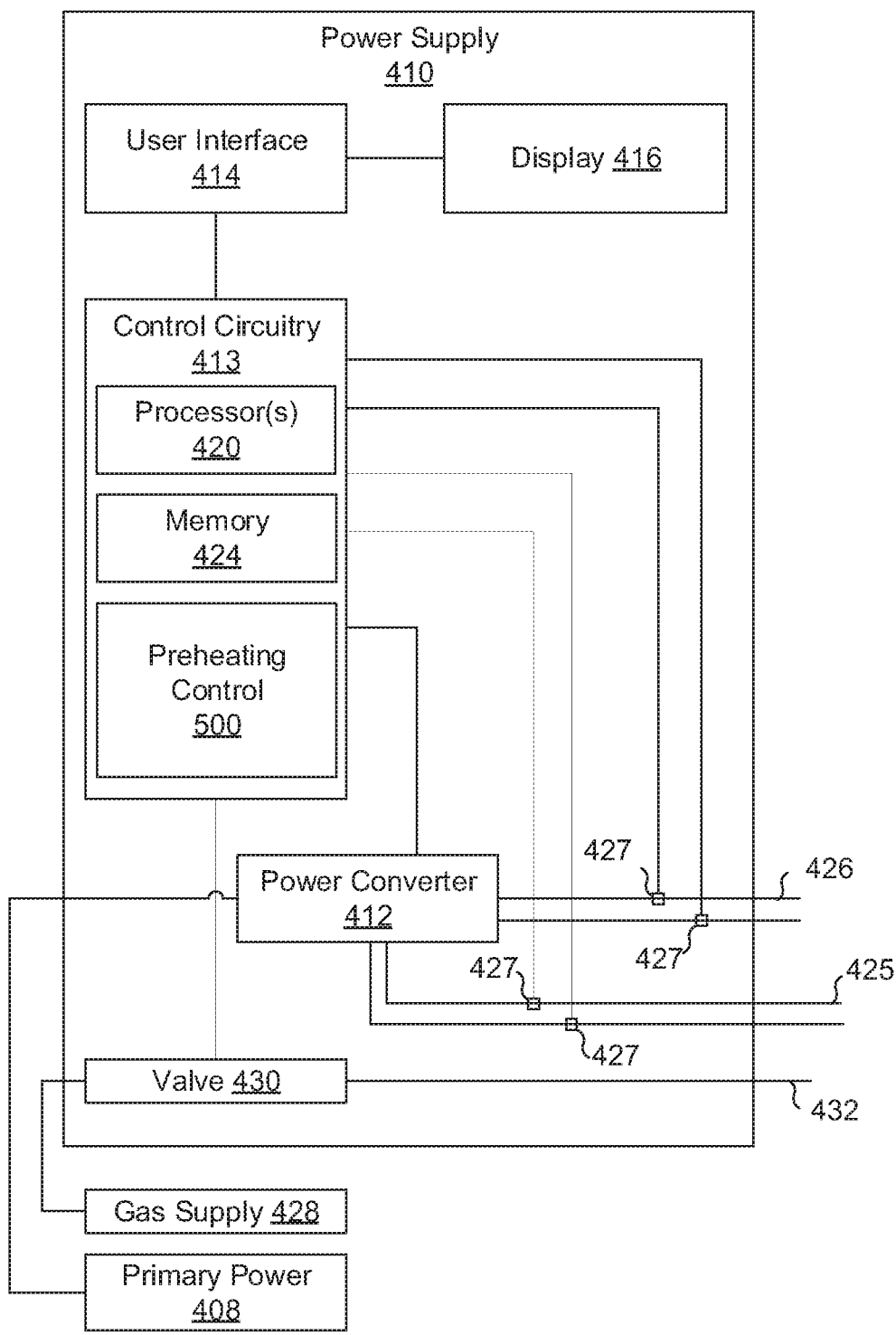
FIG. 4 is a block diagram illustrating an example power supply having control circuitry such as may be used in FIGS. 2-3, in accordance with aspects of this disclosure.

FIG. 4 is a block diagram of an example power supply 410. In some examples, the power supply 410 may be an implementation of some or all of the power supplies 210b, 310, 212a, 212b, 312a, 312b of FIGS. 2 and 3. For example, the power supply 410 may comprise an implementation of the welding power supplies 212a, 312a and/or preheating power supplies 212b, 312b, where each power supply 212a, 312a, 212b, 312b has its own control circuitry 413. Alternatively, the power supply 410 may comprise an implementation of the power supplies 210b, 310, with the weld outputs 426 comprising the welding power supplies 212a, 312a, the auxiliary outputs 425 comprising the preheat power supplies 212b, 312b, and/or the control circuitry 413 comprising the control circuitry 413 and controlling both the welding power supplies 212a, 312a and preheat power supplies 212b, 312b. In some examples, the power supply 410 may include or be implemented in a wire feeder. As shown, the power supply 410 includes the preheating control process 500 common to the control circuitries 213, 313 of systems 200 and 300.

In the example of FIG. 4, the power supply 410 includes a valve 430 configured to control flow of shielding gas (e.g., argon, helium, carbon dioxide, etc.) from a gas supply 428. The valve 430 may be opened, closed, or otherwise operated by control circuitry 413 to enable, inhibit, and/or control gas flow. As shown, a hose 432 is connected to the valve 430 to route shielding gas exiting the valve 430 (e.g., to a welding torch and/or wire feeder). In some examples, the cable 423 may be packaged with conduit 118. In some examples, the power supply 212a, 212b does not include the gas supply 428, the valve 430, and/or the hose 432.

In the example of FIG. 4, the power supply 410 is configured to supply power to welding operations and/or preheating operations. As shown, the power supply 410 receives primary power 408 (e.g., from the AC power grid, an engine/generator set, a battery, or other energy generating or storage devices, or a combination thereof), conditions the primary power, and provides an output power to one or more welding devices and/or preheating devices in accordance with demands of the system. In some examples, the primary power 408 may be supplied from an offsite location (e.g., the primary power may originate from the power grid). In the example of FIG. 3, the power supply 410 includes a power converter 412 that receives AC input power from the primary power 408 and converts the AC input power to AC and/or DC welding-type output power output as dictated by the demands of the system (e.g., particular welding processes and regimes). In some examples, the power converter 412 may include one or more transformers, rectifiers, choppers, inverters, switches, and/or other circuitry. In some examples, the power converter 412 may be an implementation of one or more of the power supplies 212a, 212b, 312a, 312b.

In the example of FIG. 4, the power converter 412 has a primary output 426 (e.g., for welding-type power and/or wire feeder power) and an auxiliary output 425 (e.g., for preheating power, wire feeder power, welding component power, general device power, etc.). In some examples, the power converter 412 is adapted to convert primary power only to welding-type power, and a separate auxiliary converter is provided to convert primary power to auxiliary power. In some other examples, the power supply 410 receives a converted auxiliary power output directly from a wall outlet. In the example of FIG. 4, sensors 427 are attached to the lines of the primary output 426 and auxiliary output 425. In some examples, the sensors 427 are configured to measure and/or detect power transmitted through the lines of the primary output 426 and auxiliary output 425. As shown, the sensors 427 are coupled to control circuitry 413, such that the control circuitry may receive feedback and/or data from the sensors 427.

In the example of FIG. 4, the power supply 410 includes control circuitry 413 to control operation of the power converter 412. In some examples, the power converter 412 may include one or more controllable circuit elements (e.g., transistors, switches, relays etc.) configured to change states and/or output (e.g., open/close, turn off/on, increase/decrease power, adjust power through pulse control or other control, etc.) in response to one or more signals provided by the control circuitry 413. As shown, the power supply 410 also includes a user interface 414 that is connected to the control circuitry 413, such that the control circuitry 413 may receive input (e.g., from a user) via the user interface 414. In some examples, a user may choose a process and/or input desired parameters (e.g., voltages, currents, particular pulsed or non-pulsed welding regimes, and so forth) through the user interface 414. The user interface 614 may receive inputs using any input device, such as via a keypad, keyboard, buttons, touch screen, voice activation system, wireless device, etc. In some examples, the user interface 414 may include one or more data ports configured for connection to a remote device (e.g., a memory stick, mobile device, computer, laptop, etc.). As shown, the user interface 414 is also connected to a display screen 416, through which data may be displayed to the user (and/or received from the user where the display screen 416 is a touch screen, for example).

In the example of FIG. 4, the control circuitry 413 includes memory 424 and one or more processors 420. In some examples, the memory 424 may store data (e.g., data corresponding to a welding application), instructions (e.g., software or firmware to perform welding processes), and/or any other appropriate data. In some examples, the one or more processors 420 may be configured to execute instructions stored in memory 424. In some examples, the memory 424 may store instructions pertaining to the preheating control process 500.

Figure 5:
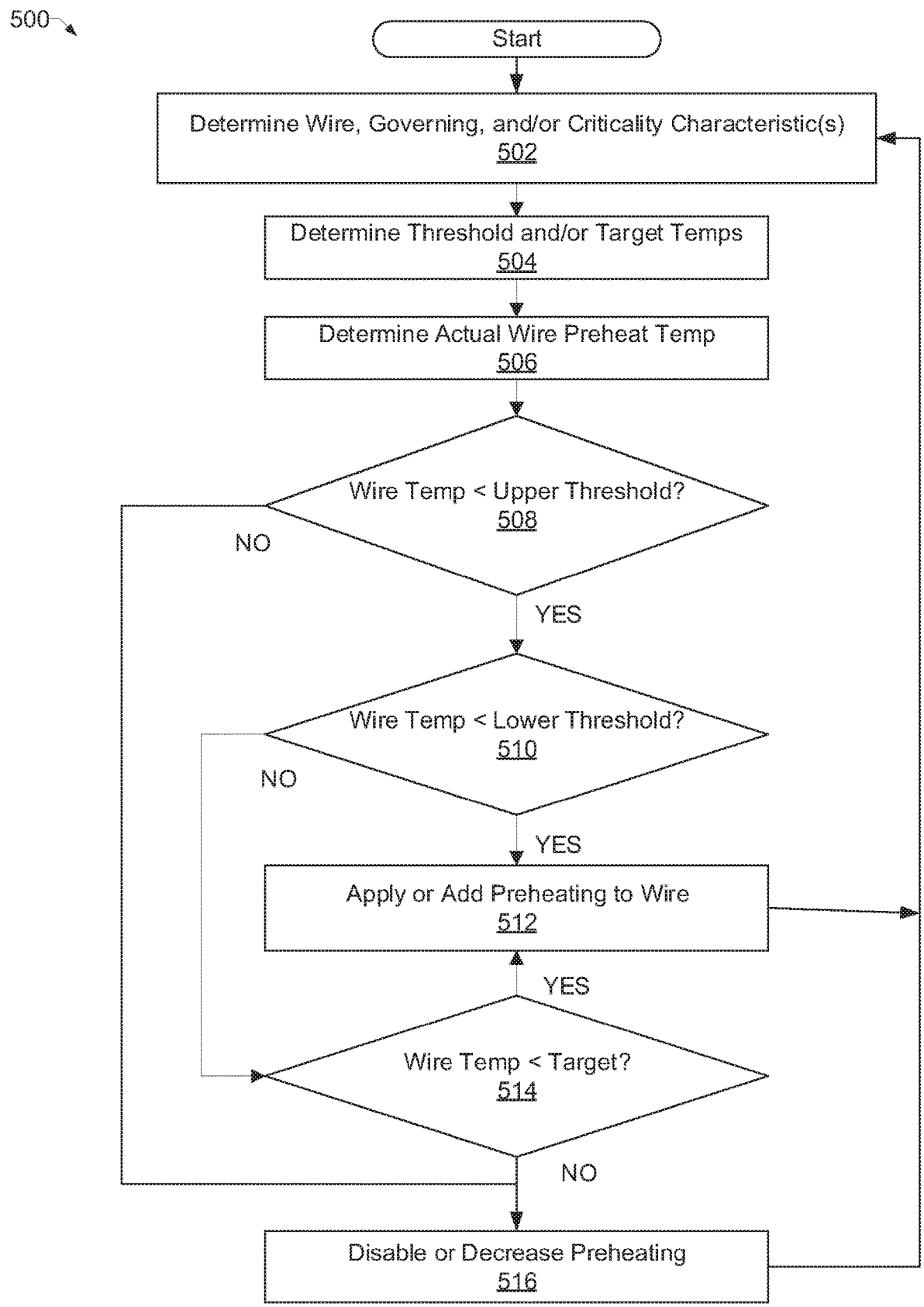
FIG. 5 is a flowchart representative of an example preheating control, in accordance with aspects of this disclosure.

FIG. 5 is a flowchart representative of an example preheating control process 500, which may be executed to control preheating of the electrode wire 114. In some examples, some or all of the preheating control process 500 may be implemented in instructions stored in memory 424 and/or executed by the one or more processors 420. In some examples, some or all of the preheating control process 500 may be implemented in analog and/or discrete circuitry. The preheating control process 500 is configured to control the preheating power supply 212b, 312b to preheat the electrode wire 114 so as to enable hot electrode welding, while ensuring the temperature of the electrode wire 114 remains below a level that may cause degradation and/or deformation of the electrode wire 114, such that might impact column strength, wire feedability, weld process stability, and/or welding consumable longevity. In some examples, the preheating control process 500 continually monitors the preheat temperature of the electrode wire 114 and adjusts the power output of the preheat power supply 212b, 312b accordingly.

In some examples, the preheating control process 500 begins upon user selection, such as via the user interface 414. In some examples, the preheating control process 500 begins upon initiation by other operations of the control circuitry 413. Once begun, the preheating control process 500 determines welding wire characteristics, a governing characteristic, and/or a criticality of the characteristics at block 502. In some examples, wire type may be determinative of other welding wire characteristics. In some examples, welding wire characteristics may be determined and/or identified via user input through user interface 414. For example, a model number, universal product code (UPC), and/or any a physical description of the wire may be entered through user interface 414. In some examples, a device (e.g., barcode reader, interrogator, etc.) in communication with the power supply 410 may scan and/or read one or more tags (e.g., UPC tag, NFC tag, RFID tag, Bluetooth tag, or some other wireless communication tag, etc.) associated with the wire (e.g., attached to the wire spool 209) to determine the wire type and/or wire characteristics. The determination of wire characteristics, a governing characteristic, and/or a criticality of the characteristics at block 502 is discussed in more detail with respect to FIG. 6, below.

Once the welding wire characteristics have been determined, the preheating control process 500 determines which welding wire characteristic(s) comprise the governing characteristic(s) (e.g., the weakest link(s)). Further, the preheat control may determine a criticality of the welding wire characteristic(s), which may inform and/or override the governing characteristic(s) determination. In some examples, the preheating control process 500 may use a look-up table and/or other memory structure to determine welding wire characteristics, governing characteristic(s), and/or criticality of the characteristics.

At block 504, the preheating control process 500 determines an upper temperature threshold, lower temperature threshold, and/or target temperature based on the governing characteristic and/or criticality determinations. An example upper temperature threshold may be a maximum temperature beyond which the governing characteristic is believed to experience deformation and/or degradation that will have a negative impact on the welding system and/or welding process. An example lower threshold may be a minimum temperature necessary for hot electrode welding given the welding wire characteristics, such as a minimum temperature necessary to boil away and/or vaporize water, hydrogen, lubricant, and/or some other substance. In some examples, the target temperature is determined to be an approximate midpoint between the upper and lower thresholds and/or an ideal temperature for preheated electrode welding. In some examples, the threshold temperatures and/or target temperature may be manually input (and/or overridden) by an operator, such as through the operator interface 414. In some examples, block 502 may be skipped when the threshold temperatures and/or target temperature is manually input. In some examples, block 502 may still be performed even when the threshold temperatures and/or target temperature is manually input, such as if the threshold temperatures and/or target temperature is manually input in terms of homologous temperature, for example.

In some examples, the temperature thresholds and/or target temperature may be determined as homologous temperatures, or as fractions of a melting point (and/or vaporization or boiling point) using the Kelvin (K) scale. In some examples, the thresholds and/or targets may be continually set at particular homologous temperatures, with the actual temperature determined based on the homologous temperature and a melting temperature of the material. In some examples, the thresholds and/or targets may be adjustable homologous temperatures, such as adjusted based on one or more wire characteristics. Thus, for example, the upper target temperature threshold may be determined to be a homologous temperature of approximately 0.8 (or 0.7, 0.75, 0.85, 0.9, 0.95, etc.), if, for example, it is determined that degradation and/or deformation begins to have a substantial impact at that homologous temperature. Likewise, in some examples the lower temperature threshold may be determined to be a homologous temperature of approximately 0.1 (or 0.05, 0.075, 0.125, 0.15, etc.), if, for example, it is determined that hot electrode welding requires that minimum homologous temperature. As another example, the target temperature may be determined to be approximately 0.5 (that being the halfway homologous temperature) or approximately 0.45 (that being the halfway homologous temperature between 0.8 and 0.1). Thereafter, the actual temperature thresholds and/or target temperature may be determined based on the homologous temperature and the melting point (and/or melting temperature) of the governing characteristic material. For example, if the governing characteristic is determined to be the aluminum sheath (melting point of 933.5 K), the target temperature may be determined to be a homologous temperature of 0.5, or approximately half the melting temperature of aluminum, and the actual target temperature may be determined to be 466.75 K (e.g., 0.5*933.5 K=466.75K). In some examples, the melting point used by the preheating control process 500 may vary depending on the size (and/or diameter, thickness) of the governing characteristic material.

At block 506, the preheating control process 500 determines the existing wire preheat temperature, or the existing temperature of the electrode wire 114 at a position between the wire spool 209 and torch contact tip 214, 318. In some examples, the determination may be done by measuring the actual preheat temperature of the wire 114 via sensor 350. In some examples, the temperature may be determined by the preheating control process 500 and/or control circuitry 413 based on a wire feed speed, wire resistance, and/or measured power output from the power converter 412 (e.g., via sensors 427). In some examples, the preheating control process 500 may use a model, look-up table, and/or mechanism to estimate preheat temperature based on the measured power output.

At block 508, the preheating control process 500 determines whether the existing wire preheat temperature is below the upper temperature threshold. If not, then the preheating control process 500 proceeds to block 516 where heating of the electrode wire 114 is disabled and/or decreased (e.g., by disabling and/or decreasing power output from the preheating power supply 212*b*, 312*b* and/or power converter 412, and/or setting the power output to zero). If the existing wire preheat temperature is below the upper temperature threshold, then the preheat control proceeds to block 510 where the preheat control determines whether the existing wire preheat temperature is below the lower threshold. If so, then preheating is applied to the electrode wire at block 512. If not, then the preheating control process 500 proceeds to block 514, where the preheating control process 500 determines if the existing wire preheat temperature is below the target temperature. If so, then preheating is applied to the electrode wire at block 512. If not, then no additional heat may be applied, and the preheating control process 500 returns to block 502. In some examples, the preheating control process 500 may instead return to block 504 or 506 after blocks 512 and/or 516, such as if, for example, there is no change in the welding wire.

In some examples, the amount of preheating applied at block 512 differs depending on the route taken to block 512. For example, more preheating (and/or an increased preheating power) may be applied when coming from block 510 than from block 514. In some examples, the amount of preheating may be maintained and/or unchanged in block 512 when coming from block 514. In some examples, the preheating control process 500 may interact with the control circuitry 413 and/or other components of the welding system to prohibit further welding operations until the electrode wire 114 has been preheated above the lower threshold temperature and/or below the upper threshold.

Figure 6:
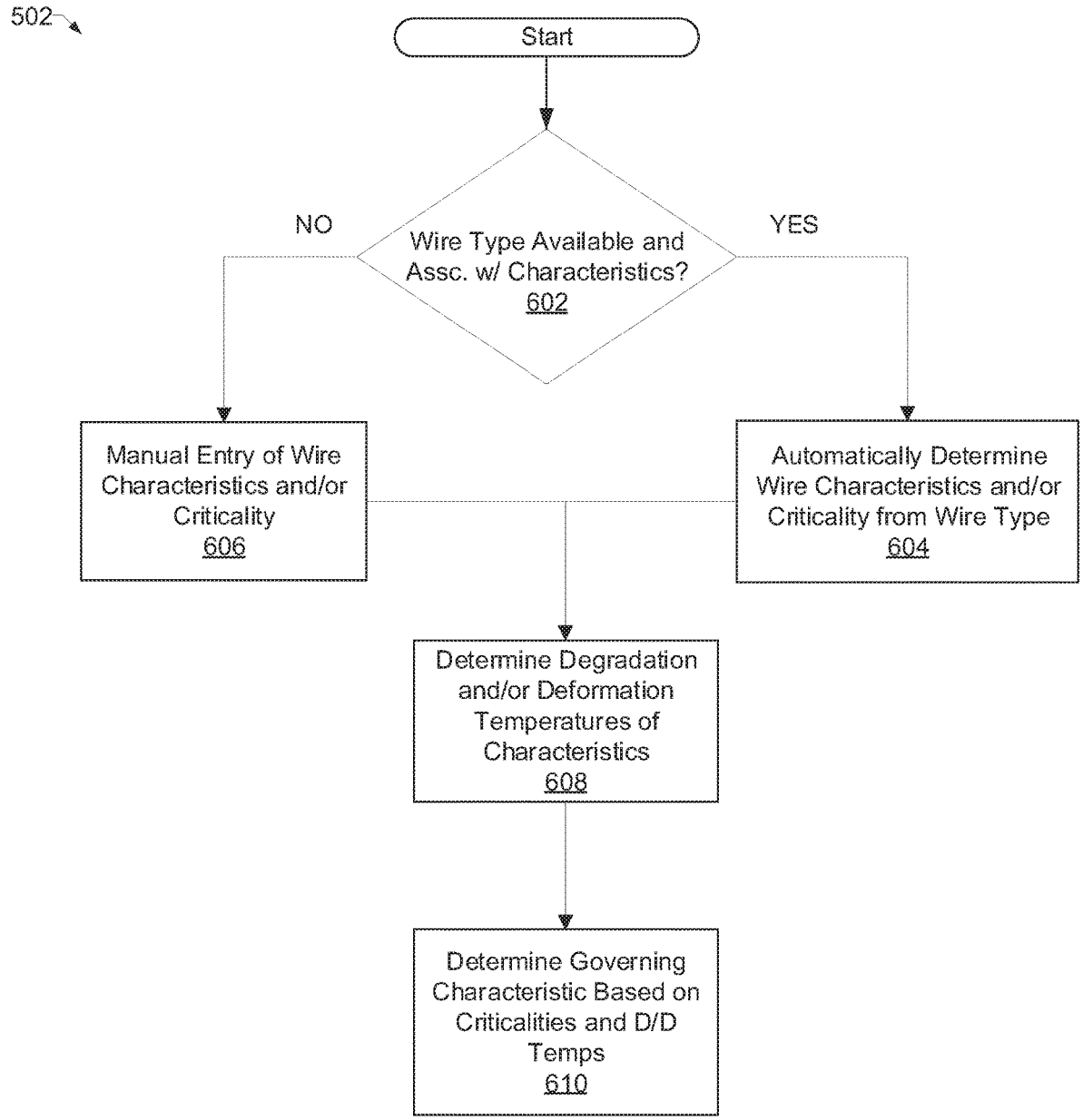
FIG. 6 is a flowchart representative of a portion of the example preheating control of FIG. 5, in accordance with aspects of this disclosure.

FIG. 6 is a flowchart representative of an example block 502 of the preheating control process 500. At block 602, the preheating control process 500 determines whether there is an available wire type of the electrode wire 114 that is associated with and/or determinative of the wire characteristics and/or criticality of the characteristics. For example, the memory 424 may include a database, lookup table, and/or other data structure where welding wire characteristics and/or criticality of the characteristics may be referenced according to wire type. In some examples, the determination at block 602 may comprise an input of a wire type (e.g., through user input and/or scanning, as discussed above) and/or an attempt to locate (and/or load) the welding wire characteristics and/or criticality of the characteristics based on the wire type. If the preheating control process 500 determines there is an available wire type of the electrode wire 114 that is associated with and/or determinative of the wire characteristics and/or criticality of the characteristics, then the preheating control process 500 loads the welding wire characteristics and/or criticality of the characteristics at block 604. Otherwise, the preheating control process proceeds to block 606 where the wire characteristics and/or criticality of the characteristics may be manually entered (e.g., via user interface 414).

Whether manually entered or automatically determined, the preheating process 500 next proceeds to block 608 where degradation and/or deformation temperatures of the welding wire characteristics are determined. In some examples, these temperatures may be automatically loaded at block 604 and/or manually entered at block 606. For example, the preheating process may determine that the electrode wire 114 has a core of material A and a sheath of material B, and may determine (e.g., through automatic retrieval and/or manual input) temperatures at which each material (A and B) begins to degrade and/or deform. In some examples, the melting point of the material may influence the degradation and/or deformation temperature. In some examples, the material and/or the proportions (e.g., size, thickness, diameter, weight, volume, area etc.) of the characteristics may influence the degradation and/or deformation temperature.

Following block 608, the preheating control process 500 determines the governing characteristic based on the criticalities and the degradation and/or deformation temperatures at block 610. In some examples, the preheating control process 500 may determine one governing characteristic and determine the thresholds and/or target from that governing characteristic. In some examples, the preheating control may determine multiple governing characteristics, and determine each threshold and/or target based on a different governing characteristic. In some examples, the preheating control may determine multiple governing characteristics, and determine the thresholds based on the same governing characteristic, but the target based on a different governing characteristic. For example, the preheating control may determine the lower threshold based on a welding wire characteristic with the highest melting, degradation, deformation, and/or hot electrode temperature (adjusted for criticality), the upper threshold based on a characteristic with the lowest melting, degradation, and/or deformation temperature (adjusted for criticality), and/or the target based on the characteristic that is deemed most critical.

In some examples, the preheating control process 500 may first determine the governing characteristic(s) based on the lowest (and/or highest) degradation and/or deformation temperatures. In some examples, the preheating control process 500 may modify the governing characteristic(s) based on the characteristic criticalities. For example, a user may indicate at block 606, or the preheating control process 500 may automatically determine at block 604, a criticality ranking of characteristics and/or materials. In some examples, characteristics and/or materials may share the same rank. In some examples, characteristics and/or materials may each have a distinct rank. In some examples, the preheating control process 500 may override the initial governing characteristic determination based on the criticalities (and/or differences in criticalities), such as if there is a difference of a criticality magnitude greater than some threshold magnitude. For example, the preheating control process 500 may change the governing characteristic from characteristic A to characteristic C if A has the lowest (and/or highest) degradation and/or deformation temperature, but C is ranked far more critical. In some examples, the relative degradation and/or deformation temperatures may also play a role. For example, the preheating control process 500 may change the governing characteristic from characteristic A to characteristic B if A has the lowest (and/or highest) degradation and/or deformation temperature, B and C are ranked more critical, but the degradation and/or deformation temperature of C is far higher (or far lower) than A or B, such that C is unlikely to become an issue, while the degradation and/or deformation temperatures B is far closer to that of A.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A welding-type system, comprising:
   a wire preheater configured to heat a welding wire between a wire supply of the welding wire and deposition of the welding wire on a weldment; and
   control circuitry configured to:
      determine one or more characteristics of the welding wire,
      determine a criticality of the one or more characteristics,
      determine a governing characteristic of the welding wire based on the one or more characteristics and the criticality of the one or more characteristics,
      determine at least one of a threshold preheat temperature or a target preheat temperature based on the governing characteristic, and
      control the wire preheater to heat the welding wire based on the threshold preheat temperature or the target preheat temperature.

2. The system of claim 1, wherein the control circuitry is configured to determine the governing characteristic based on one or more of a wire type, wire diameter, wire sheath thickness, wire material, wire plating material, or wire lubricant.

3. The system of claim 2, wherein one or more of the wire type, wire diameter, wire sheath thickness, wire material, wire plating material, or wire lubricant is entered by a user or automatically determined by the control circuitry.

4. The system of claim 1, wherein the control circuitry is configured to determine the threshold preheat temperature or the target preheat temperature based on a homologous temperature of the governing characteristic.

5. The system of claim 1, wherein the threshold preheat temperature comprises a threshold above which the governing characteristic would experience degradation, or deformation, that would impact a column strength of the welding wire, a feedability of the welding wire, a stability of a welding process, or a longevity of a welding consumable.

6. The system of claim 1, wherein the preheater comprises a plurality of contact tips, a contact tip and a wire supply roller, or a focused energy source.

7. The system of claim 1, wherein the welding-type system further comprises:
   a welding torch having a torch contact tip; and
   the wire supply, the wire supply configured to feed the welding wire to the welding torch, the wire preheater configured to heat the welding wire between the wire supply and the torch contact tip.

8. A method of preheating a welding wire, the method comprising:
   determining one or more characteristics of the welding wire;
   determining a criticality of the one or more characteristics;
   determining, via control circuitry, a governing characteristic of the welding wire based on the one or more characteristics and the criticality of the one or more characteristics;
   determining, via control circuitry, at least one of a threshold preheat temperature or a target preheat temperature based on the governing characteristic; and
   heating the welding wire to a non-zero temperature based on the threshold preheat temperature or the target preheat temperature.

9. The method of claim 8, wherein determining the governing characteristic comprises identifying a degradation temperature of one or more of a wire type, wire diameter, wire sheath thickness, wire material, wire plating material, or wire lubricant.

10. The method of claim 9, further comprising automatically identifying one or more of the wire type, wire diameter, wire sheath thickness, wire material, wire plating material, or wire lubricant via control circuitry.

11. The method of claim 9, further comprising receiving user identification of one or more of the threshold preheat temperature, target preheat temperature, wire type, wire diameter, wire sheath thickness, wire material, wire plating material, or wire lubricant via a user interface.

12. The method of claim 8, wherein determining the threshold preheat temperature or the target preheat temperature is further based on a homologous temperature of the governing characteristic.

13. A wire preheating power supply, comprising:
   power conversion circuitry configured to convert input power to preheating power and output the preheating power to a wire preheater; and
   control circuitry configured to:
      determine one or more characteristics of a welding wire,
      determine a criticality of the one or more characteristics,
      determine a governing characteristic of the one or more characteristics based on the criticality,
      determine at least one of a temperature threshold or a target temperature based on the governing characteristic, and
      control the power conversion circuitry or wire preheater to preheat the welding wire to a temperature above or below the temperature threshold, or to a temperature approximately equal to the target temperature.

14. The power supply of claim 13, wherein the control circuitry is configured to determine the governing characteristic based on one or more degradation or deformation temperatures of the one or more characteristics.

15. The power supply of claim 13, wherein the control circuitry is further configured to determine an actual preheat temperature of the welding wire and control the power conversion circuitry in response to the actual preheat temperature being above the target temperature or the threshold temperature.

16. The power supply of claim 13, wherein the control circuitry is further configured to determine an actual preheat temperature of the welding wire and control the power conversion circuitry to increase the preheating power in response to the actual preheat temperature being below the target temperature or the threshold temperature.

17. The power supply of claim 13, wherein the control circuitry is further configured to determine an actual preheat temperature of the welding wire and control the power conversion circuitry to decrease the preheating power in response to the actual preheat temperature being above the target temperature or the threshold temperature.

\* \* \* \* \*